(12) United States Patent
Stratmann et al.

(10) Patent No.: US 11,690,377 B2
(45) Date of Patent: Jul. 4, 2023

(54) HERBICIDAL COMPOSITION AND METHOD OF USE THEREOF

(71) Applicant: Belchim Crop Protection NV, Londerzeel (BE)

(72) Inventors: Christian Stratmann, Vierhöfen (DE); James R. Whitehead, Oxford, MS (US); Felix Thurwächter, Hamburg (DE)

(73) Assignee: Belchim Crop Protection NV, Londerzeel (BE)

( * ) Notice: Subject to any disclaimer, the term of this patent is extended or adjusted under 35 U.S.C. 154(b) by 0 days.

(21) Appl. No.: 16/033,860

(22) Filed: Jul. 12, 2018

(65) Prior Publication Data

US 2019/0021326 A1    Jan. 24, 2019

Related U.S. Application Data

(60) Provisional application No. 62/534,022, filed on Jul. 18, 2017.

(51) Int. Cl.
*A01N 47/06* (2006.01)
*A01N 41/10* (2006.01)
*A01N 43/58* (2006.01)
*A01N 35/06* (2006.01)

(52) U.S. Cl.
CPC ............ *A01N 43/58* (2013.01); *A01N 35/06* (2013.01); *A01N 47/06* (2013.01)

(58) Field of Classification Search
CPC combination set(s) only.
See application file for complete search history.

(56) References Cited

U.S. PATENT DOCUMENTS

| | | | | |
|---|---|---|---|---|
| 3,953,445 | A * | 4/1976 | Schonbeck | A01N 47/06 544/241 |
| 5,006,158 | A | 4/1991 | Carter et al. | |
| 5,506,195 | A * | 4/1996 | Ensminger | A01N 41/10 504/350 |
| 7,056,863 | B1 | 6/2006 | Bieringer et al. | |
| 2009/0247597 | A1* | 10/2009 | Vermeer | A01N 25/30 514/383 |
| 2019/0380338 | A1* | 12/2019 | Bristow | A01N 41/02 |

FOREIGN PATENT DOCUMENTS

| | | | |
|---|---|---|---|
| CN | 101965835 | * | 2/2011 |
| CN | 103039490 | * | 4/2013 |
| WO | 01/28341 | A2 | 4/2001 |
| WO | 2016156241 | A1 | 10/2016 |

OTHER PUBLICATIONS

Allison, R., "Maize growers gain extra post-em option to kill weeds," Farmers Weekly, Mar. 3, 2017, pp. 1-3.*
HCAPLUS abstract 2011:183544; abstracting CN 101965835 (2011).*
CN 103039490 abstracted by Derwent accession No. 2013-P59065 (2013).*
Machine translation of CN 101965835 (Feb. 2011).*
Machine translation of CN 103039490 (Apr. 2013).*
PCT/US2018/041847, International Search Report dated Sep. 3, 2018, 6 pgs.
T. Geeroms: "Synergy Between Pyridate and HPPO-Inhibitors Opens New Possibilities for the Control of Weeds in Maize", Abstracts 68th International Symposium on Crop Protection, May 17, 2016 (May 17, 2016), p. 78, XP055501617.
Anonymous: "Pflanzenschutz im Mais 2016—Bauernzeitung", Mar. 30, 2016 (Mar. 30, 2016), XP055501585.
Peter Heinisch: "ONYX—Komplett Pack und ONYX Power Set—Wirkungsstarke Herbizdli:isungen IUr den fruhen Nachauflauf im Mais!", Apr. 28, 2017 (Apr. 28, 2017), XP055501591.
Anomymous: "Produkt Wirkstoff(e) Einstufung nach HRAC 3) Aufwandmenge pro ha Amaranth GansefuBgewachse Kamille Schw. Nachtschatten Klettenlabkraut Knotericharten Franzosenkraut Ehrenpreisarten Ackerdistel Ackerwinde Hirsearten Quecke Preise EUR/ha1) Abstande zu Oberflachen-gewassern in m 2)", May 16, 2017 (May 16, 2017) XP055501480.
Anonymous: "Neue Unkrauter und Ungraser im Ackerbau-Teil 2 Landwirtschaftskammer—Pflanzenschutz", Mar. 31, 2017 (Mar. 31, 2017), XP055501477.
Chris Lyddon, "Maize growers gain new herbicide" Agronomist & Arable Farmer, http://www.aafarmer.co.uk/crops/cereals/maize-growers-gain-new-herbicide.html, Mar. 1, 2017, pp. 1-2.
Herbicide Mode of Action Table, weedscience.org, Jul. 2008.
Herbicide Classification, Take Action Herbicide-Resistance Management, 2016 United Soybean Board.

* cited by examiner

*Primary Examiner* — John Pak
(74) *Attorney, Agent, or Firm* — Hodgson Russ LLP

(57) ABSTRACT

Described are herbicidal compositions that contain mesotrione and pyridate, as well as related method to control weeds in crops, such as of maize, sweet corn, oilseed rape, cereals, rice, peanuts, vegetables wheat, barley, rye, rice, maize, sugar beet, cotton and soybeans.

19 Claims, No Drawings

HERBICIDAL COMPOSITION AND METHOD OF USE THEREOF

PRIORITY CLAIM

This application claims the benefit of U.S. Provisional Application No. 62/534,022, filed Jul. 18, 2017, entitled "Herbicidal Composition and Method of Use Thereof," the entire disclosure of which is incorporated herein by reference for all purposes.

FIELD

The present invention relates to herbicidal compositions that contain mesotrione and pyridate, as a concentrate or as a concentrate combined with water, and to uses of such compositions for controlling weeds, including methods of treating valuable crop plants or their environment by applying a herbicidal composition (e.g., a tank mixture) that includes mesotrione and pyridate.

BACKGROUND

Mesotrione is a p-Hydroxyphenyl pyruvate dioxygenase inhibitor (HPPD inhibitor), which affects carotenoid biosynthesis. Selectivity in maize derives from differential metabolism (to the 4-hydroxy derivative) and also possibly from slower foliar uptake. An description of this compound can be found at U.S. Pat. No. 5,006,158, the entirety of which is incorporated herein by reference. It has the following structure:

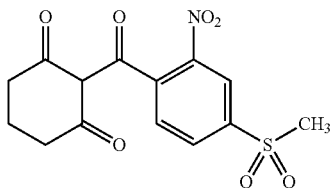 [SMILES: CS(=O)(=O)c1ccc(C(=O)C2C(=O)CCCC2=O)c([N+](=O)[O-])c1]

Pyridate is photosynthetic electron transport inhibitor at the photosystem II receptor site. It is a selective contact herbicide, absorbed predominantly by the leaves. It is described in U.S. Pat. No. 3,953,445 and has the following structure:

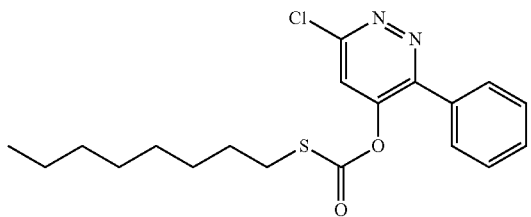 [SMILES: CCCCCCCCSC(=O)Oc1cc(Cl)nnc1-c1ccccc1]

Patent publication WO200128341 describes a combination of HPPD-inhibitors with a list of co-herbicides. The description of the HPPD-inhibitor includes a very extensive list of generic and specific compounds that includes many thousands of species, but does not specifically identify mesotrione.

SUMMARY

According to the present invention, Applicant has now determined that the two herbicide compounds mesotrione and pyridate, when applied together to common invasive weeds, including pre- and post-emergence of the weeds, is particularly useful and can be shown to exhibit a greater efficacy against the weeds, both broadleaf and grassy, as compared to the efficacy predicted from that of the individual compounds. While mesotrione and pyridate are not presently novel compounds themselves, to the Applicant's understanding the agricultural chemical ("agrochemical") arts have not determined and have not suggested that the use of these two compounds together (e.g., in a single composition) would be effective or would produce an improved or synergistic effect.

In one aspect, the invention relates to a method of controlling undesirable vegetation. The method includes: providing a composition comprising mesotrione and pyridate, and applying the composition to undesirable vegetation associated with a crop plant, a habitat of a crop plant, or a combination thereof.

In another aspect the invention relates to an agricultural concentrate composition that contains mesotrione and pyridate, and that may optionally contain one or more acceptable adjuvant or additive ingredients. The concentrate can be combined with water to form a "application composition" (e.g., "tank mixture") that includes the mesotrione, pyridate, and other optional ingredients, in concentrations that can be effectively and conveniently applied to a crop or crop habitat by spraying.

DETAILED DESCRIPTION

It is a common practice in the crop protection arts to develop agricultural compositions that include two or more biologically active substances. Reasons for combining biologically active substances in use may vary, and may include improving efficacy of treatment of herbicide-resistant weeds, broadening of a biological action spectrum of a herbicide, avoidance of successive applications of different active substances, etc.

Applicant has now surprisingly found that an agricultural composition that includes an amount of mesotrione and an amount of pyridate, when applied to common invasive weeds, in any one of several stages of development, including pre- and post-emergence of the weeds, can show improved efficacy against the weeds, both broadleaf and grassy, when compared to the efficacy predicted from that of the individual compounds, when applied to valuable crop plants.

The crops of useful plants in which the present composition can be applied are, but are not limited to, crop plants of economical importance such as, for example, maize, sweet corn, oilseed rape, cereals, rice, peanuts, vegetables wheat, barley, rye, rice, maize, sugar beet, cotton and soybeans. Such crops of useful plants also include known genetically modified plants or genetically modified plants yet to be developed. These genetically modified plants present advantageous properties, such as resistances to specific herbicides, resistances to plant diseases or pathogens of plant diseases (e.g. specific insects or fungi).

Some non-limiting examples of weeds that can be controlled by application of a combination of mesotrione and pyridate include: Palmer Amaranth (*Amaranthus palmeri*), Powell Amaranth (*Amaranthus powellii*), Spiny Amaranth (*Amaranthus spinosus*); Atriplex (*Chenopodium orach*), Catchweed Bedstraw (*Galium aparine*), Broadleaf signalgrass (*Urochloa platyphylla*), Wild Buckwheat (*Polygonum convolvulus*), Buffalobur (*Solanum rostratum*), Burcucumber (*Sicyos angulatus*), Carpetweed *verticillata*), Wild Carrot (*Daucus carota*), common Chickweed (*Stellaria media*), common Cocklebur (*Xanthium strumarium*), Chamomile Com (*Matricaria* spp.), Spurry Corn (*Spergula arvensis*), large Crabgrass (*Digitaria sanguinalis*), Dandelion (*Taraxacum officinale*), purple Deadnettle (*Lamium purpureum*), spotted Deadnettle (*Lamium maculatum*), curly Dock (*Rumex crispus*), Eclipta (*Eclipta prostrata*), Galinsoga (*Galinsoga parviflora*), Hemp (*Cannabis sativa*), Henbit (*Lamium amplexicaule*), Horsenettle (*Solanum carolinense*), Horseweed (marestail) (*Conyza canadensis*), Jimsonweed (*Datura stramonium*), prostrate Knotweed (*Polygonum aviculare*), Kochia (*Kochia scoparia*), common Lambsquarters (*Chenopodium album*), Venice Mallow (*Hibiscus trionum*), Mayweed Chamomile (*Anthemis cotula*), entireleaf Morningglory (*Ipomoea hederacea*), ivyleaf Morningglory (*Ipomoea hederacea*), pitted Morningglory (*Ipomoea lacunose*), wild Mustard (*Brassica kaber*), American black Nightshade (*Solanum americanum*), black Nightshade (*Solanum nigrum*), eastern black Nightshade (*Solanum ptycanthum*), hairy Nightshade (*Solanum sarrachoides*), purple Nightshade (*Solanum xanti*), yellow Nutsedge (*Cyperus esculentus*), fringed Pigweed (*Amaranthus fimbriatus*), prostrate Pigweed (*Amaranthus albus*), redroot Pigweed (*Amaranthus retroflexus*), smooth Pigweed (*Amaranthus hybridus*), tumble Pigweed (*Amaranthus albus*), common Pokeweed (*Phytolacca americana*), volunteer Potatoes (*Solanum* spp.), Florida Pusley (*Richardia scabra*), common Ragweed (*Ambrosia artemisiifolia*), giant Ragweed (*Ambrosia trifida*), hemp Sesbania (*Sesbania exaltata*), Shepherdspurse (*Capsella bursa-pastoris*), prickly Sida (teaweed) (*Sida spinosa*), ladysthumb Smartweed (*Polygonum persicaria*), pale Smartweed (*Polygonum lapathifolium*), Pennsylvania Smartweed (*Polygonum pensylvanicum*), common Sunflower (*Helianthus annuus*), Canada Thistle (*Circium arvense*), Russian Thistle (*Salsola iberica*), Velvetleaf (*Abutilon theophrasti*), common Waterhemp (*Amaranthus rudis*), tall Waterhemp (*Amaranthus tuberculatus*), Yellow rocket (*Barbarea vulgaris arcuata*).

The present invention relates to novel herbicidal compositions that include a combination of mesotrione and pyridate, and to methods in which such a composition is used to control weeds, such as broad-leaved and grassy weeds, in crops of useful plants.

The invention also relates to compositions that include mesotrione and pyridate to be applied before sowing, pre-emergence, or post-emergence to crops of useful plants, the composition including mesotrione and pyridate, optionally in combination with one or more co-formulants such as organic solvent, aqueous carrier, surface-active substances (e.g., surfactants), processing aids, among others.

The composition may be in the form of a "concentrate," which is a composition that includes concentrated amounts of the biologically active mesotrione and pyridate ingredients, and that is normally sold, stored, or transported in the concentrated form, and is designed to be diluted, dissolved, or otherwise combined with water by a user to form an "application composition," "spray mixture," or "tank mixture" followed by application to a plant or soil by spraying. The concentrate can be combined with water to form an aqueous herbicide application composition that may be in any useful form, with certain preferred forms being those of a solution, an emulsion, a suspension, a microemulsion, or another form of flowable liquid that may be prepared in a tank by combining the concentrate with water. The resultant herbicide application composition may be applied to a field or to a plant or area of plants by spraying, by passing the composition through a nozzle with pressure.

The invention also relates to methods of controlling grasses and weeds in crops of useful plants, the method including treating the useful plants or seeds or cuttings thereof or the area (i.e., soil) under cultivation with a composition according to the invention. For reasons of clarity, areas under cultivation are to be understood as including land where the crop plants are already growing or where seed material of the crop plants has been sown as well as land intended for the cultivation of those crop plants.

The herbicidal composition according to the invention, in the form of a concentrate, can be in the form of any type of formulation suitable to be conveniently combined with water to form a tank mixture that may be applied by spraying to crops of valuable plants. Examples of certain useful forms of a concentrate include a wettable granule, dust (e.g., wettable powder), emulsifiable concentrate, or suspension concentrate. The concentrate composition may contain an amount of water or organic solvent and may be in a liquid form, or may be a non-liquid that contains not more than a low amount of water or organic solvent. These types of agricultural compositions are known to the skilled person in the art of agrochemical formulations and are described, for example, in: "McCutcheon's Detergents and Emulsifiers Annual", MC Publishing Corp., Glen Rock, N.J., 1988; K. Martens, "Spray Drying Handbook", 3rd Ed. 1979, G. Goodwin Ltd. London; Winnacker-Kuchler, "Chemische Technologie [Chemical Technology]", Hauser Verlag Munich, 4th Ed. 1986; van Valkenburg, "Pesticides Formulations", Marcel Dekker N.Y., 2nd Ed. 1972-73; M. and J. Ash, "Encyclopedia of Surfactants", Vol. I-III, Chemical Publishing Co., New York, 1980-1981.

Certain preferred concentrate forms of herbicidal compositions according to the invention may preferably be in the form of a solid (i.e., non-liquid or "dry") composition that is suitable to be diluted with water for application to a crop, weed, soil, etc., by spraying. Specific examples can be in the form of a dry and granular (e.g., wettable granule) composition that includes pyridate and mesotrione in useful or advantageous relative amounts, in association with agrochemical acceptable co-formulants.

Example formulations, including wettable granule compositions as well as other dry or liquid composition types can contain one or more co-formulants such as water, organic solvents, carriers, surface active agents, wetting agents, dispersing agents, and emulsifying agents, among others.

A wettable granule, a.k.a. water dispersible granule composition, refers to a herbicide or pesticide formulation that is in the form of non-liquid (essentially dry) granules to be combined with water to form a tank mixture (application composition) that can be applied by spraying. The granular product is made up of many distinct (non-liquid, e.g., solid) particles that may be within a specific particle size range, e.g., from 0.2 to 4 mm. Water dispersible (wettable) granules can be formed by methods that include: a) agglomeration, b) spray drying, or c) extrusion techniques.

As such, a dry concentrate composition such as a preferred wettable granule as described can optionally and preferably include a surface active component and optionally other components, such as one or more filler or binding agent.

The term surfactant as used herein described materials such as emulsifying agents, dispersing agents, and wetting agents. By one definition a "surfactant" is an organic compound that lowers the surface tension (or interfacial tension) between two liquids or between a liquid and a solid, typically an organic amphiphilic compound that contains a hydrophobic group (e.g., a hydrocarbon (e.g., alkyl) "tail")

and a hydrophilic group. Examples of surfactants that may be useful or preferred include nonionic and anionic surfactants.

Examples of non-ionic surfactants include, without limitation, the condensation products of ethylene oxide with fatty alcohols such as oleyl alcohol or cetyl alcohol, with alkyl phenols such as octyl phenol, nonyl phenol and octyl cresol, or with other alcohol functionality containing molecules like castor oil. Other non-ionic surfactants include the partial esters with ethylene oxide and the lecithins and phosphoxylated surfactants such as phosphorylated ethylene oxide/propylene oxide block copolymer and ethyoxylated and phorphorylated stryryl substituted phenol.

Examples of anionic surfactants include, without limitation, soaps, salts of aliphatic monoesters or sulphuric acid such as sodium lauryl sulphate, salts of sulphonated aromatic compounds (e.g. sodium dodecylbenzenesulphonate, sodium, calcium or ammonium lignosulphonate or butylnaphthalene sulphonate, and a mixture of the sodium salts of diisopropyl- and triiso-propylnapthalene sulphonates.

Preferably a surfactant of a composition as described can include at least one wetting agent such as one selected from alkyl naphthalene sulfonates, phosphate esters, sulphosuccinates and nonionics such as alkyl alcohol ethoxylate; and/or at least one dispersing agent such as one selected from the group of napthalene condensates, lignosulfonates, polyacrylates and phosphate esters.

A variety of fillers may be used in example water dispersible granule compositions. Examples of fillers include: mineral earths and clays such as, for example, kaolin, bentonite, kieselguhr, Fuller's earth, Attaclay, diatomaceous earth, bole, loess, talc, chalk, dolomite, limestone, lime, calcium carbonate, ammonium sulfate, ammonium phosphate, ammonium nitrate and urea; natural products of vegetable origin such as, for example, lactose, starch, grain meals and flours, bark meals, wood meals, nutshell meals and cellulosic powders.

Other optional adjuvants that may be useful in a composition as described include crystallization inhibitors, viscosity-modifying substances, suspending agents, dyes, antioxidants, foaming agents, stabilizers, mixing aids, antifoams, complexing agents, neutralizing or pH-modifying substances and buffers, corrosion-inhibitors, fragrances, wetting agents, absorption improvers, micronutrients, plasticizers, glidants, lubricants, thickeners, antifreezes, microbiocides, and also liquid and solid fertilizers.

On the basis of these formulations, combinations with other pesticidally active substances such as, for example, insecticides, acaricides, herbicides, fungicides, and also with safeners, fertilizers, water conditioners, or plant growth regulators can also be prepared, e.g. in the form of a concentrated adjuvant composition or as a tank mixture.

The relative amounts of mesotrione and pyridate in a composition (e.g., concentrate or tank mixture) can be any useful amounts, with examples including mesotrione and pyridate in relatively equal amounts, and other examples including mesotrione and pyridate in different amounts.

Certain examples of compositions of the invention, in concentrate form or after combining a concentrate with water, can include from 10 to 70 parts by weight mesotrione and from 30 to 90 parts by weight pyridate, e.g., from 15 to 55 parts by weight mesotrione and from 45 to 85 parts by weight pyridate, or from 20 to 50 parts by weight mesotrione and 50 to 80 parts by weight pyridate, all values being based on 100 parts by weight total mesotrione and pyridate. These amounts, being presented in parts by weight of the each of the two different active ingredients based on a total of 100 parts by weight of the same active ingredients in combination, will be the same when present in a concentrate as when present in a tank mixture or other composition made by combining the same concentrate with water and other optional ingredients such as to form a spray mixture (application composition). Example concentrate and application compositions may contain mesotrione and pyridate as essentially the only biologically active ingredients in the composition, meaning that the concentrate or application composition contains not more than 0.5 weight percent, e.g., not more than 0.1 weight percent, of any other biologically active ingredient based on the total amount of biologically active ingredient in the composition.

When considered with other optional, non-biologically active ingredients of a non-liquid "dry" concentrate, including surfactant, filler, viscosity control agent, etc., the total amount of mesotrione and pyridate in a concentrate may be, for example, from about 5, 10 or 20 up to 90 weight percent, e.g., from about 30 to 85 weight percent, or from about 35, 40, or 50 up to 60 or 70 weight percent, based on total weight of a concentrate as described. The total amount of water or organic solvent in such a "dry" concentrate can preferably be less than about 2, 1, 0.5, or 0.1 weight percent based on total weight of the concentrate.

When considered with other optional, non-biologically active ingredients of a liquid concentrate, including surfactant, filler, viscosity control agent, water, organic solvent etc., the total amount of mesotrione and pyridate in a liquid concentrate may be, for example, from about 1 or 2 up to 40 or 50 weight percent, e.g., from about 5 to 30 weight percent, or from about 8 or 10 up to about 15 or 20 weight percent based on total weight of a concentrate in liquid form as described. The total amount of water and organic solvent (combined) in such a "dry" concentrate can preferably be less than about 60, 50, 40, 30, 25, 20 or 10 weight percent based on total weight of the concentrate in liquid form.

In one embodiment of the invention, a dry concentrate herbicidal composition can contain mesotrione in a range of concentrations between 50 and 500 g/kg, and pyridate in a range of concentrations between 50 and 725 g/kg.

In these and other examples of dry concentrate herbicidal compositions, the herbicidal composition may contain mesotrione in a range of concentrations between 140 and 245 g/kg, and pyridate in a range of concentrations between 415 and 560 g/kg.

In these and other examples of dry concentrate herbicidal compositions, the herbicidal composition can include 210 g/kg of mesotrione and 479 g/kg of pyridate.

In another embodiment, a dry concentrate (or liquid concentrate) as described can be used for treating crops by combining the dry concentrate (or liquid concentrate) with water, e.g., in a spray tank, to form an application composition, and applying the application composition to a crop or environment of a crop (e.g., soil) at an application rate of from 2 to 10 oz./ac of mesotrione and 2 to 22 oz./ac of pyridate. In certain presently preferred embodiments, the application composition may be applied at an application rate of from 2 to 3 oz./ac of mesotrione and 3 to 7 oz./ac of pyridate, e.g., at an application rate of about 3 oz./ac of mesotrione and 6.84 oz./ac of pyridate.

EXAMPLE

The following example is to be considered as merely illustrative, and are not be considered as a limitation to the presently claimed invention.

Example 1

| | |
|---|---|
| Mesotrione (expressed as 100%) | 210 g/kg |
| Pyridate (expressed as 100%) | 479 g/kg |
| Sodium dodecyl sulfate | 20 g/kg |
| Sodium ligninsulfonate | 70 g/kg |
| Kaolin Clay | Up to 1000 g |

Example 2

| | |
|---|---|
| Mesotrione (expressed as 100%) | 70 g/kg |
| Pyridate (expressed as 100%) | 240 g/kg |
| Sodium dodecyl sulfate | 25 g/kg |
| Sodium ligninsulfonate | 60 g/kg |
| Ammonium Sulfate | Up to 1000 g |

Example 3

| | |
|---|---|
| Mesotrione (expressed as 100%) | 420 g/kg |
| Pyridate (expressed as 100%) | 420 g/kg |
| Sodium alkylnaphthalene sulfonate | 35 g/kg |
| Sodium alkylnaphthalenesulfonate, formaldehyde condensate | 85 g/kg |
| Starch | Up to 1000 g |

The example above can be prepared by ordinary wettable granule formulation technics of the Praxis, for example by blending all the components followed by a milling process. Granulation by e.g. a conical twin-screw extruder followed by drying in a fluidized bed dryer.

The wettable granule composition from the Example above was submitted to several physico-chemical studies, before and after an accelerated storage test. (e.g.: two weeks at 54±2° C.). This test is intended to represent a simulation of the behavior of the formulation after a storage period of 2 years. These tests were conducted according to the laws and guidelines, Regulation (EC) No. 1107/2009 of October 2009 and Commission Regulation (EU) No. 545/2011 of June 2011, here included herein by reference.

The results regarding the stability of the composition show that, after the accelerated test, all the studied physical and chemical parameters are within acceptable limits of the standard specification. It was also shown that the composition is storage stable.

BIOLOGICAL EXAMPLES

Field trials were conducted in Tennessee and Illinois (USA). The crop and weed species had been seeded and/or drill sown. In the case of post-emergence evaluation, seeded and/or drill sown plants were grown to a certain growth stage before application of the active ingredients (alone or as a mixture). In the case of pre-emergence evaluation, the application of the active ingredients was carried out after the plants were seeded and/or drilled sown.

The trial was in the form of a randomized complete block. The percentage of weed control was assessed in several different instances after treatment until a maximum of 42 days after treatment, by comparison with untreated control plots by visual scoring. The herbicidal action was assessed qualitatively and quantitatively.

The combination according to the present invention was evaluated, regarding its herbicidal performance and crop safety, against broadleaf weed and grassy weed. Examples of the weeds against which the composition according to the invention was evaluated include Common Waterhemp, Palmer Amaranth, Ivyleaf Morningglory, Green foxtail.

To quantify the synergic effect resulting from the combination of mesotrione and pyridate, the inventors used the methodology described by Colby, in which a synergistic effect exists when the activity of a composition comprising both active compounds is greater than the sum of the activities of the two active compounds applied individually. The expected activity for the combination of mesotrione and pyridate can be calculated by the following so-called "Colby equation" (see S. R. Colby, "Calculating Synergistic and Antagonistic Responses of Herbicide Combinations", Weeds 1967, 15, 20-22).

$$P_{a+b} = (P_a + P_b) - (P_a * P_b / 100)$$

Wherein $P_{a+b}$ is the expected percent inhibition of weed growth by the combination of mesotrione and pyridate;

$P_a$ is the percent inhibition of weed growth induced by mesotrione;

$P_b$ is the percent inhibition of weed growth induced by pyridate.

If the actual percent inhibition of weed growth induced by the combination of mesotrione and pyridate is greater than the expected percent inhibition ($P_{a+b}$) calculated from the Colby equation, then the activity of the combination is synergistic.

The below Tables represent the herbicidal performance of the composition according to the invention, and also the herbicidal performance of the active ingredients alone, in controlling specific weeds. The expected percent inhibition of weed growth (derived from the Colby's equation) and the actual (observed) percent inhibition of weed growth is also presented in order to conclude on the synergistic effect of the combination according to the invention.

Post-Emergence Herbicidal Performance of the Composition According to the Invention Against Broadleaf Weed in Corn.

TABLE 1

Post-emergence efficacy of the composition according to the invention against AMATA weed.

| a.i. [oz./A] | | | Days after herbicidal treatment | | |
|---|---|---|---|---|---|
| mesotrione | pyridate | | (7) | (14) | (28) |
| 2 | 0 | Mean | 73 | 75 | 73 |
| 0 | 2 | Mean | 0 | 0 | 0 |
| 2 | 2 | Mean | 75 | 78 | 79 |
| | | Colby† | 73 | 75 | 73 |
| 3 | 0 | Mean | 73 | 73 | 68 |
| 0 | 3 | Mean | 0 | 0 | 0 |
| 3 | 3 | Mean | 83 | 83 | 84 |
| | | Colby† | 73 | 73 | 68 |
| 3 | 0 | Mean | 68 | 80 | 85 |
| 0 | 6.84 | Mean | 10 | 12 | 6 |
| 3 | 6.84 | Mean | 83 | 87 | 89 |
| | | Colby† | 71 | 82 | 86 |

AMATA - Common Waterhemp (*Amaranthus rudis*)
†Colby, S. R. "Calculating Synergistic and Antagonistic Responses of Herbicide Combinations" Weeds, 15(1), pp 20-22 (1967).

TABLE 2

Post-emergence efficacy of the composition according to the invention against AMAPA weed.

| a.i. [oz/A] | | | Days after herbicidal treatment | | |
|---|---|---|---|---|---|
| mesotrione | pyridate | | (8) | (16) | (21) |
| 3 | 0 | Mean | 53 | 55 | 55 |
| 0 | 6.84 | Mean | 23 | 33 | 33 |
| 3 | 6.84 | Mean | 78 | 85 | 85 |
| | | Colby† | 63 | 70 | 70 |

AMAPA - Palmer Pigweed (*Amaranthus palmeri*)
†Colby, S. R. "Calculating Synergistic and Antagonistic Responses of Herbicide Combinations" Weeds, 15(1), pp 20-22 (1967).

TABLE 3

Post-emergence efficacy of the composition according to the invention against IPOHE weed.

| a.i. [oz/A] | | | Days after herbicidal treatment | | |
|---|---|---|---|---|---|
| mesotrione | pyridate | | (8) | (16) | (21) |
| 2 | 0 | Mean | 43 | 35 | 38 |
| 0 | 2 | Mean | 28 | 18 | 18 |
| 2 | 2 | Mean | 68 | 60 | 58 |
| | | Colby† | 58 | 46 | 48 |
| 3 | 0 | Mean | 68 | 63 | 60 |
| 0 | 3 | Mean | 40 | 10 | 10 |
| 3 | 3 | Mean | 70 | 70 | 75 |
| | | Colby† | 81 | 66 | 64 |
| 3 | 0 | Mean | 65 | 78 | 75 |
| 0 | 6.84 | Mean | 10 | 23 | 23 |
| 3 | 6.84 | Mean | 78 | 88 | 90 |
| | | Colby† | 69 | 83 | 81 |

IPOHE - Ivyleaf Morningglory (*Ipomoea headrace*)
†Colby, S. R. "Calculating Synergistic and Antagonistic Responses of Herbicide Combinations" Weeds, 15(1), pp 20-22 (1967).

TABLE 4

Post-emergence efficacy of the composition according to the invention against SETVI weed.

| a.i. [oz/A] | | | Days after herbicidal treatment | | |
|---|---|---|---|---|---|
| mesotrione | pyridate | | (14) | (21) | (38) |
| 2 | 0 | Mean | 48 | 50 | 50 |
| 0 | 2 | Mean | 10 | 10 | 10 |
| 2 | 2 | Mean | 60 | 68 | 60 |
| | | Colby† | 53 | 55 | 55 |
| 3 | 0 | Mean | 58 | 60 | 60 |
| 0 | 3 | Mean | 10 | 10 | 10 |
| 3 | 3 | Mean | 68 | 65 | 65 |
| | | Colby† | 62 | 64 | 64 |

SETVI - Green foxtail (*Setaria viridis*)
†Colby, S. R. "Calculating Synergistic and Antagonistic Responses of Herbicide Combinations" Weeds, 15(1), pp 20-22 (1967).

Pre-Emergence Herbicidal Performance of the Composition According to the Invention Against Broadleaf Weed in Corn.

TABLE 5

Pre-emergence efficacy of the composition according to the invention against AMAPA weed.

| a.i. [oz/A] | | | Days after herbicidal treatment | | | |
|---|---|---|---|---|---|---|
| mesotrione | pyridate | | (7) | (14) | (28) | (42) |
| 3.85 | 0 | Mean | 62 | 64 | 40 | 34 |
| 0 | 6.84 | Mean | 37 | 42 | 20 | 20 |
| 3.85 | 6.84 | Mean | 100 | 84 | 52 | 52 |
| | | Colby† | 76 | 79 | 52 | 47 |

AMAPA - Palmer Pigweed (*Amaranthus palmeri*)
†Colby, S. R. "Calculating Synergistic and Antagonistic Responses of Herbicide Combinations" Weeds, 15(1), pp 20-22 (1967).

TABLE 6

Pre-emergence efficacy of the composition according to the invention against ELEIN weed.

| a.i. [oz/A] | | | Days after herbicidal treatment | | | |
|---|---|---|---|---|---|---|
| mesotrione | pyridate | | (7) | (14) | (28) | (42) |
| 3.85 | 0 | Mean | 65 | 78 | — | — |
| 0 | 6.84 | Mean | 37 | 37 | — | — |
| 3.85 | 6.84 | Mean | 95 | 93 | — | — |
| | | Colby† | 78 | 86 | | |

ELEIN - Goosegrass (*Eleusine indica*)
†Colby, S. R. "Calculating Synergistic and Antagonistic Responses of Herbicide Combinations" Weeds, 15(1), pp 20-22 (1967).

TABLE 7

Pre-emergence efficacy of the composition according to the invention against IPOHE weed.

| a.i. [oz/A] | | | Days after herbicidal treatment | | | |
|---|---|---|---|---|---|---|
| mesotrione | pyridate | | (7) | (14) | (28) | (42) |
| 3.85 | 0 | Mean | 62 | 64 | 40 | 34 |
| 0 | 6.84 | Mean | 37 | 42 | 20 | 20 |
| 3.85 | 6.84 | Mean | 100 | 84 | 52 | 52 |
| | | Colby† | 76 | 79 | 52 | 47 |

IPOHE - Ivyleaf Morningglory (*Ipomoea headrace*)
†Colby, S. R. "Calculating Synergistic and Antagonistic Responses of Herbicide Combinations" Weeds, 15(1), pp 20-22 (1967).

CONCLUSION $P_{a+b}$ is the expected percent inhibition of weed growth by the combination of mesotrione and pyridate;

$P_a$ is the percent inhibition of weed growth induced by mesotrione;

$P_b$ is the percent inhibition of weed growth induced by pyridate.

If the actual percent inhibition of weed growth induced by the combination of mesotrione and pyridate is greater than the expected percent inhibition ($P_{a+b}$) calculated from the Colby equation, then the activity of the combination is synergistic.

The above tables show that the composition of mesotrione and pyridate exhibit greater efficacy in controlling grassy as well as broadleaf weeds, when compared to the individual application of mesotrione and pyridate. The results show that there is a difference in the expected and actual weed control with the combination of mesotrione and pyridate, thus indicative of synergistic activity as per Colby's formula.

No phytotoxicity symptoms were observed in the plots treated with the combination according to the invention.

The invention claimed is:

1. A method of controlling undesirable vegetation, the method comprising:
    providing a dry granular concentrate composition that comprises:
        from 10 to 55 parts by weight mesotrione,
        from 45 to 90 parts by weight pyridate, wherein a weight total of mesotrione and pyridate is 100 parts,
        at least two different surfactants, wherein the surfactants are an alkyl sulfate and a ligninsulfonate or an alkyl naphthalene sulfonate and a polymer condensate of the alkyl naphthalene sulfonate with formaldehyde, wherein the total surfactant concentration is 8.5 to 12% by weight, and
        less than 2 weight percent water based on total weight of the dry granular concentrate composition,
    combining the dry granular concentrate composition with water to form a diluted herbicide composition, and
    applying the diluted herbicide composition to resistant undesirable vegetation associated with a crop plant, a habitat of a crop plant, or a combination thereof.

2. The method according to claim 1 wherein the diluted herbicide composition is applied post-emergence to the undesirable vegetation.

3. The method according to claim 1 wherein the diluted herbicide composition is applied post-emergence to the undesirable vegetation.

4. The method according to claim 1, comprising applying 2 to 10 ounces/acre of mesotrione and 2 to 22 oz./ac of pyridate.

5. The method according to claim 1, comprising applying 2 to 3 oz./ac of mesotrione and 3 to 7 oz./ac of pyridate.

6. The method of claim 1, wherein the crop plant is selected from maize, sweet corn, oilseed rape, cereals, rice, peanuts, vegetables, wheat barley, rye, sugar beet, cotton, and soybeans.

7. The method of claim 1, wherein the undesirable vegetation is a weed.

8. The method of claim 7, wherein the weed is a grassy weed or a broadleaf weed.

9. The method of claim 1, wherein the dry granular concentrate composition contains mesotrione and pyridate in an amount from 5% to 90% by weight of the total dry granular concentrate composition.

10. The method according to claim 1, wherein the dry granular concentrate composition contains from 50 to 500 g/kg of mesotrione and from 50 to 725 g/kg of pyridate.

11. The method according to claim 1, wherein the dry granular concentrate composition contains from 70 to 245 g/kg of mesotrione and from 415 to 560 g/kg of pyridate.

12. The method according to claim 1, wherein the dry granular concentrate composition is a water dispersible granule composition that comprises the mesotrione, pyridate, and agrochemical acceptable co-formulants selected from: ionic wetting agent, dispersing agent, anti-foam agent, filler, and inert.

13. An agricultural dry granular concentrate composition that contains mesotrione and pyridate, the dry granular concentrate composition comprising:
    from 10 to 55 parts by weight mesotrione,
    from 45 to 90 parts by weight pyridate, wherein a weight total of mesotrione and pyridate is 100 parts,
    at least two different surfactants, wherein the surfactants are an alkyl sulfate and a ligninsulfonate or an alkyl naphthalene sulfonate and a polymer condensate of the alkyl naphthalene sulfonate with formaldehyde, wherein the total surfactant concentration is 8.5 to 12% by weight, and
    less than 2 weight percent water based on total weight dry granular concentrate composition.

14. The dry granular concentrate composition of claim 13 containing at least 50 weight percent mesotrione and pyridate (combined total weight) and less than 1 weight percent water, based on total weight of the dry granular concentrate composition.

15. The dry granular concentrate composition of claim 13 comprising from 15 to 55 parts by weight mesotrione and from 45 to 70 parts by weight pyridate.

16. The dry granular concentrate composition of claim 13 wherein the surfactant comprises an alkyl sulfate.

17. The dry granular concentrate composition of claim 13 wherein the surfactant comprises ligninsulfonate.

18. The dry granular concentrate composition of claim 13 wherein the surfactant comprises alkyl naphthalene sulfonate and ligninsulfonate.

19. A method of controlling undesirable vegetation, the method comprising:
    providing a dry granular concentrate composition that comprises:
        from 10 to 55 parts by weight mesotrione,
        from 45 to 90 parts by weight pyridate, wherein a weight total of mesotrione and pyridate is 100 parts, wherein the mesotrione is present at 50 g/kg to 420 g/kg of the dry granular concentrate composition, and wherein the pyridate is present at 50 g/kg to 725 g/kg of the dry granular concentrate composition;
        at least two different surfactants, wherein the surfactants are an alkyl sulfate and a ligninsulfonate or an alkyl naphthalene sulfonate and a polymer condensate of the alkyl naphthalene sulfonate with formaldehyde, wherein the total surfactant concentration is 8.5 to 12% by weight, and
        filler, and
        less than 2 weight percent water based on total weight of the dry granular concentrate composition,
    combining the dry granular concentrate composition with water to form a diluted herbicide composition, and
    applying the diluted herbicide composition to resistant undesirable vegetation associated with a crop plant, a habitat of a crop plant, or a combination thereof at an application rate of 2 to 3 ounces/acre of mesotrione and 3 to 7 ounces/acre of pyridate.

* * * * *